United States Patent
Ahn et al.

(10) Patent No.: US 8,396,511 B2
(45) Date of Patent: Mar. 12, 2013

(54) APPARATUS AND METHOD FOR DETERMINING AN UPLINK TRANSMISSION FORMAT IN A BROADBAND WIRELESS COMMUNICATION SYSTEM

(75) Inventors: Byung-Chan Ahn, Seoul (KR); Jang-Won Park, Yongin-si (KR); Young-Soon Lee, Yongin-si (KR); Eun-Jin Lee, Suwon-si (KR); Soo-Yeul Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 12/038,303

(22) Filed: Feb. 27, 2008

(65) Prior Publication Data
US 2008/0207122 A1  Aug. 28, 2008

(30) Foreign Application Priority Data
Feb. 28, 2007  (KR) .................. 10-2007-0020019

(51) Int. Cl.
*H04M 1/00* (2006.01)
(52) U.S. Cl. ........................... 455/561; 455/522
(58) Field of Classification Search .......... 455/522, 455/39, 67.11, 447, 69, 452.2, 126, 67.13; 370/318, 335, 311, 208, 294, 329, 342
See application file for complete search history.

(56) References Cited

U.S. PATENT DOCUMENTS

| | | | | |
|---|---|---|---|---|
| 6,308,298 B1 * | 10/2001 | Blatchley et al. | ............. | 714/775 |
| 6,330,455 B1 * | 12/2001 | Ichihara | ........................ | 455/522 |
| 6,934,268 B1 * | 8/2005 | Hedlund et al. | ............. | 370/311 |
| 7,050,760 B2 * | 5/2006 | Itoh | ............................. | 455/67.13 |
| 7,130,587 B2 * | 10/2006 | Hikokubo et al. | ......... | 455/67.11 |
| 2002/0119757 A1 * | 8/2002 | Hamabe | ......................... | 455/69 |
| 2003/0092459 A1 * | 5/2003 | Blessent | ...................... | 455/522 |
| 2004/0218559 A1 * | 11/2004 | Kim et al. | ..................... | 370/318 |
| 2005/0020271 A1 * | 1/2005 | Fukuda et al. | ................ | 455/447 |
| 2005/0064821 A1 * | 3/2005 | Hedberg et al. | ............ | 455/67.11 |
| 2005/0232135 A1 * | 10/2005 | Mukai et al. | .................. | 370/208 |
| 2006/0141939 A1 * | 6/2006 | Nakada | ............................ | 455/69 |
| 2006/0187885 A1 * | 8/2006 | Roy et al. | ...................... | 370/332 |

FOREIGN PATENT DOCUMENTS

| | | |
|---|---|---|
| KR | 10-1999-0049436 A | 7/1999 |
| KR | 10-2006-0117116 A | 11/2006 |
| WO | 00/35120 A1 | 6/2000 |
| WO | 2004/049652 A1 | 6/2004 |

* cited by examiner

*Primary Examiner* — Lana N Le
*Assistant Examiner* — Golam Sorowar
(74) *Attorney, Agent, or Firm* — Jefferson IP Law, LLP

(57) ABSTRACT

An apparatus and method in a broadband wireless communication system are provided. The apparatus includes a Base Station (BS) which includes a manager for increasing a set point associated with a Mobile Station (MS) if an error is detected in a burst received from the MS, a detector for incrementing a counter associated with the MS if a difference, between a maximum Transmission (Tx) power of the MS and a Tx power used by the MS when transmitting the burst in which the error was detected, is less than a difference threshold, and a determining unit for providing control such that a number of slots allocated to the MS decreases if the counter associated with the MS is greater than a counter threshold.

24 Claims, 3 Drawing Sheets

APPARATUS AND METHOD FOR DETERMINING AN UPLINK TRANSMISSION FORMAT IN A BROADBAND WIRELESS COMMUNICATION SYSTEM

PRIORITY

This application claims the benefit under 35 U.S.C. §119 (a) to a Korean patent application filed in the Korean Intellectual Property Office on Feb. 28, 2007 and assigned Serial No. 2007-20019, the entire disclosure of which is hereby incorporated by reference.

BACKGROUND OF THE INVENTION

1. Field of the Invention

The present invention relates to a broadband wireless communication system. More particularly, the present invention relates to an apparatus and method for determining an UpLink (UL) transmission format in a broadband wireless communication system.

2. Description of the Related Art

In the next generation communication system, also known as the 4th Generation (4G) communication system, research is being conducted to provide a Quality of Service (QoS) with a data transfer speed of about 100 Mbps. An example of a 4G communication system is an Institute of Electrical and Electronics Engineers (IEEE) 802.16 communication system. The IEEE 802.16 communication system employs an Orthogonal Frequency Division Multiplexing (OFDM)/Orthogonal Frequency Division Multiple Access (OFDMA) scheme so that a broadband network can be supported by a physical channel of the wireless communication system.

In the IEEE 802.16 communication system, a Base Station (BS) obtains channel state information with respect to a Mobile Station (MS), and determines an UpLink (UL) transmission format of the MS. Examples of the UL transmission format include a Modulation and Coding Scheme (MCS), the number of slots, etc. The channel state information may be represented by UL Transmission (Tx) power. Power control for regulating the UL Tx power is classified into one of inner loop power control and outer loop power control. In the inner loop power control, Tx power of the MS is adjusted to a reference value of a preset Signal to Interference and Noise Ratio (SINR). The reference value is referred to as a set point. In the outer loop power control, the set point is changed according to a channel state of the MS.

A process of determining the UL transmission format of the MS by the BS will now be described below. First, the BS determines an MCS level for an MS so as to control interference. In this case, the BS allows a high MCS level to be assigned to an MS located near the BS, and allows a low MCS level to be assigned to an MS located near an edge of the BS's service area. Even when a plurality of MSs use the same MCS level, a different SINR may be required according to a channel state of each MS. Therefore, the BS performs the outer loop power control and thus determines a set point such that a Burst Error Rate (BER) of the MS can be satisfied. The set point is used to determine the Tx power of the MS. The Tx power of the MS is used to determine the number of slots allocated to the MS.

However, when the aforementioned method of determining the UL transmission format is used, system performance deteriorates in the following two environments.

In a first environment, channel quality rapidly deteriorates. As a result, a time point at which the channel state information is obtained and a time point at which the UL transmission format is determined by using the channel state information are different by several frames. In other words, the BS determines the UL transmission format by using the channel state information which was obtained several frames before the current frame. Thus, when the channel quality rapidly deteriorates, the MS continuously increases Tx power in order to satisfy a Reception (Rx) SINR of the BS. However, the amount that the Tx power can be increased is limited. Accordingly, at a certain time point, the maximum Tx power will be reached. In this case, since the UL Tx power is calculated for each sub-carrier, the BS cannot know whether the Rx SINR is satisfied or not. That is, even when the Tx power reaches its limitation and thus the MS is using a Tx power that is lower than what is needed, the BS may estimate that a low Tx power is being used because the channel quality is good. In this case, the BS determines a transmission format such that the MS can use numerous slots. As a result, the Rx SINR is continuously reduced, thereby decreasing system performance.

In a second environment, a required BER is not satisfied for a specific MCS level. For example, when multiple paths between the MS and the BS significantly vary in length, even if the MS is located near the BS, the required BER will not be satisfied for some of the higher MCS levels. The MCS level is determined so as to control interference and is based on a Tx power value. Therefore, the required BER may not be satisfied in a channel condition where the Rx SINR is restricted. That is, if a maximum Rx SINR is less than an SINR required for the MCS level, the required BER is not satisfied.

Therefore, when the BS determines the UL transmission format of the MS, system performance deteriorates in the aforementioned first and second environments. That is, a UL scheduling method and an outer loop control method which are conventionally used in the broadband wireless communication system cannot prevent deterioration of system performance in the aforementioned first and second environments.

SUMMARY OF THE INVENTION

An aspect of the present invention is to address at least the above-mentioned problems and/or disadvantages and to provide at least the advantages described below. Accordingly, an aspect of the present invention is to provide an apparatus and method for preventing deterioration of system performance, which occurs in an environment where channel quality rapidly deteriorates, in a broadband wireless communication system.

Another aspect of the present invention is to provide an apparatus and method for preventing deterioration of system performance, which occurs in an environment where a Signal to Interference and Noise Ratio (SINR) is restricted, in a broadband wireless communication system.

Another aspect of the present invention is to provide an apparatus and method for determining an UpLink (UL) transmission format by detecting exceptional conditions, which cannot be addressed by a conventional power control mechanism, in a broadband wireless communication system.

According to an aspect of the present invention, a Base Station (BS) apparatus in a broadband wireless communication system is provided. The apparatus includes a manager for increasing a set point associated with a Mobile Station (MS) if an error is detected in a burst received from the MS, a detector for incrementing a counter associated with the MS if a difference, between a maximum Transmission (Tx) power of the MS and a Tx power used by the MS when transmitting the burst in which the error was detected, is less than a difference threshold, and a determining unit for decreasing a number of slots allocated to the MS, if the counter associated with the MS is greater than a counter threshold.

According to another aspect of the present invention, a BS apparatus in a broadband wireless communication system is provided. The apparatus includes a manager for increasing a set point associated with a Mobile Station (MS) if an error is detected in a burst received from the MS, a detector for incrementing a counter associated with the MS if the error is detected in the received burst, and a determining unit for decreasing a Modulation and Coding Scheme (MCS) level associated with the MS, if the counter associated with the MS is greater than a counter threshold.

According to another aspect of the present invention, a BS apparatus in a broadband wireless communication system is provided. The apparatus includes a manager for increasing a set point associated with a Mobile Station (MS) if an error is detected in a burst received from the MS, a first detector for incrementing a first counter associated with the MS if a difference, between a maximum Transmission (Tx) power of the MS and a Tx power used by the MS when transmitting the burst in which the error was detected, is less than a difference threshold, a second detector for incrementing a second counter associated with the MS if the error is detected in the received burst, and a determining unit for decreasing a number of slots allocated to the MS, if the first counter associated with the MS is greater than a first counter threshold, and for decreasing a Modulation and Coding Scheme (MCS) level associated with the MS, if the second counter is greater than a second counter threshold.

According to another aspect of the present invention, a method of determining a UL transmission format by a BS in a broadband wireless communication system is provided. The method includes increasing a set point associated with a Mobile Station (MS) if an error is detected in a burst received from the MS, incrementing a counter associated with the MS if a difference, between maximum Transmission (Tx) power of the MS and Tx power used by the MS when transmitting the burst in which the error was detected, is less than a difference threshold, and decreasing a number of slots allocated to the MS, if the counter associated with the MS is greater than a counter threshold.

According to another aspect of the present invention, a method of determining a UL transmission format by a BS in a broadband wireless communication system is provided. The method includes increasing a set point associated with a Mobile Station (MS) if an error is detected in a burst received from the MS, incrementing a counter associated with the MS if the error is detected in the received burst, and decreasing a Modulation and Coding Scheme (MCS) level associated with the MS, if the counter associated with the MS is greater than a counter threshold.

According to another aspect of the present invention, a method of determining a UL transmission format by a BS in a broadband wireless communication system is provided. The method includes incrementing a first counter associated with a Mobile Station (MS) if an error is detected in a burst received from the MS and if a difference, between a maximum Transmission (Tx) power of the MS and a Tx power used by the MS when transmitting the burst in which the error was detected, is less than a difference threshold, incrementing a second counter associated with the MS if the error is detected in the received burst, decreasing a number of slots allocated to the MS, if the first counter associated with the MS is greater than a first counter threshold, and decreasing a Modulation and Coding Scheme (MCS) level associated with the MS, if the second counter is greater than a second counter threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, exemplary techniques of the present invention will be described in which exceptional conditions that cannot be addressed by a conventional power control mechanism are detected, and in which an UpLink (UL) transmission format is determined to address the detected conditions in a broadband wireless communication system.

Exemplary embodiments of the present invention will hereinafter be described by considering two conditions. That is, a condition in which correct channel information cannot be used because channel quality has rapidly deteriorated, and a condition in which a Reception (Rx) Signal to Interference and Noise Ratio (SINR) is restricted by a channel characteristic and thus a Burst Error Rate (BER) of a specific Modulation and Coding Scheme (MCS) level cannot be satisfied. For simplicity, in the following description of exemplary embodiments, the condition in which the channel quality rapidly deteriorates is referred to as a first condition, and the condition in which the SINR is restricted is referred to as a second condition.

Although a wireless communication system employing an Orthogonal Frequency Division Multiplexing (OFDM) scheme will be described as an example in the present invention, the present invention may also apply to other wireless communication systems that employ a different multiplexing scheme.

Figure 1:
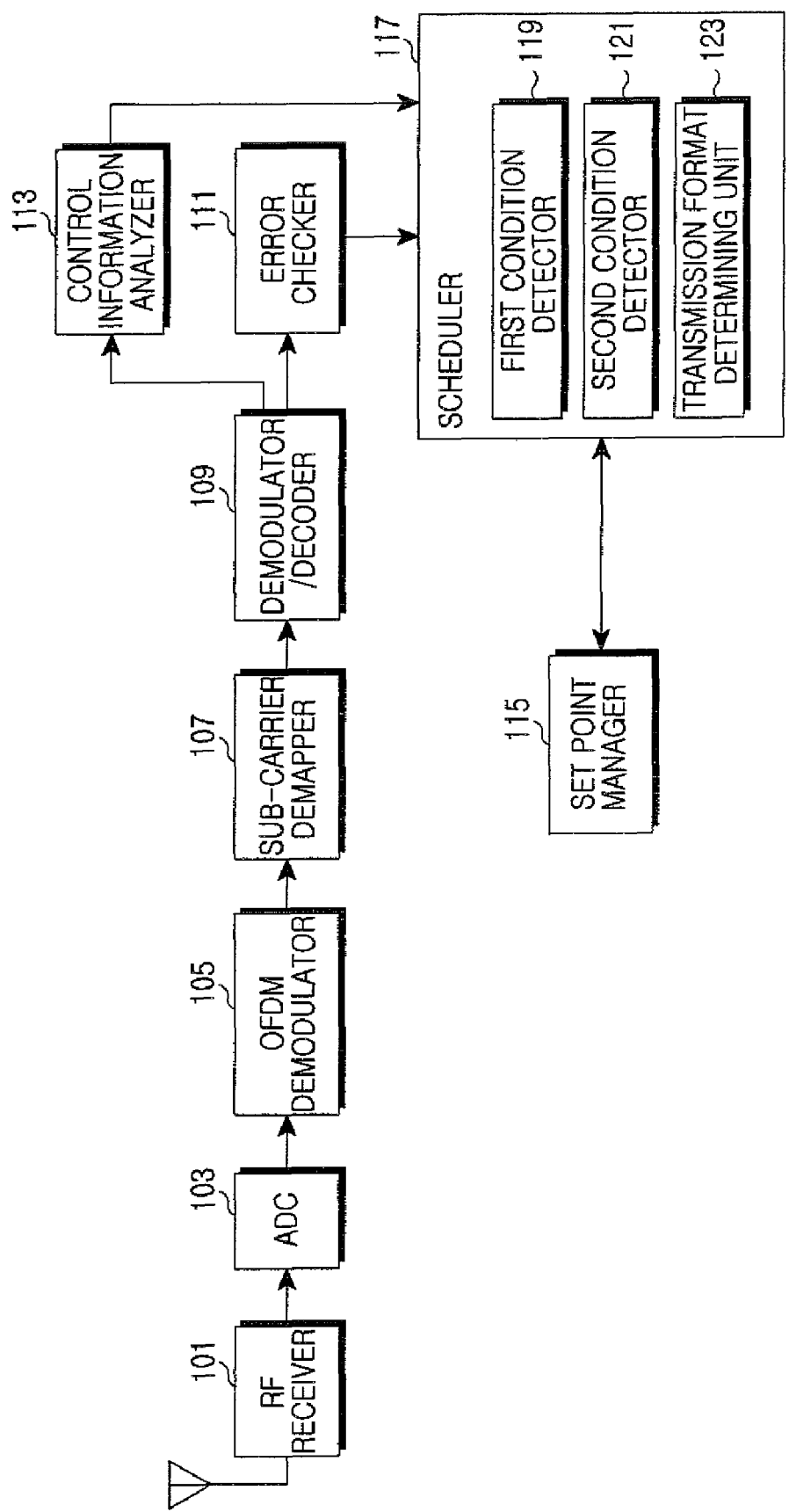
FIG. 1 is a block diagram illustrating a structure of a Base Station (BS) in a broadband wireless communication system according to an exemplary embodiment of the present invention.

FIG. 1 is a block diagram illustrating a structure of a Base Station (BS) in a broadband wireless communication system according to an exemplary embodiment of the present invention.

Referring to FIG. 1, the BS includes a Radio Frequency (RF) receiver 101, an Analog to Digital Converter (ADC) 103, an OFDM demodulator 105, a sub-carrier demapper 107, a demodulator/decoder 109, an error checker 111, a control information analyzer 113, a set point manager 115, and a scheduler 117.

The RF receiver 101 converts an RF signal received through an antenna into a baseband signal. The ADC 103 converts an analog signal output from the RF receiver 101 into a digital signal. The OFDM demodulator 105 receives a time-domain OFDM symbol from the ADC 103, removes a Cyclic Prefix (CP) from the OFDM symbol, and stores frequency-domain signals by performing a Fast Fourier Transform (FFT) operation. The sub-carrier demapper 107 classifies the frequency-domain signals provided from the OFDM demodulator 105 according to a signal processing path. The demodulator/decoder 109 demodulates and decodes the signals provided from the sub-carrier demapper 107 according to a preset method, and thus converts the signals into a bitstream. Further, the demodulator/decoder 109 provides a data burst to the error checker 111, and provides control information to the control information analyzer 113. The error checker 111 determines if an error is detected in the data burst received from a Mobile Station (MS). For example, the error may be detected by performing a Cyclic Redundancy Check (CRC) operation. The burst is a unit of traffic data in a physical layer, and includes an error checking code.

The control information analyzer 113 analyzes a message received from the MS to evaluate information included in the message. Specifically, the control information analyzer 113 analyzes Media Access Control (MAC) management messages received from the MS as well as control information provided in a header format. For example, the control information analyzer 113 analyzes the control information including a UL Transmission (Tx) power value of the MS, and provides the UL Tx power value of the MS to the scheduler 117. The control information is transmitted periodically or is transmitted according to a decision made by the MS. The control information may also be referred to as a 'bandwidth request and UL Tx power report header'.

The set point manager 115 stores and regulates a set point for controlling the Tx power of the MS. The set point is a reference value for an SINR of the MS. The Tx power of the MS is regulated to satisfy the set point. The set point manager 115 increases or decreases the set point of the MS under the control of the scheduler 117.

The scheduler 117 regulates a resource usage amount and an MCS level of the MS. In particular, according to an exemplary embodiment of the present invention, the scheduler 117 includes a first condition detector 119, a second condition detector 121, and a transmission format determining unit 123 so as to detect the aforementioned first and second conditions, and to determine a transmission format of the MS according to the detected condition. Further, the scheduler 117 controls the set point manager 115 in such a manner that the set point of the MS is increased when an error is detected in the burst received from the MS, and the set point of the MS is decreased when no error is detected in the burst. Furthermore, the scheduler 117 initializes the set point of the MS upon detecting the second condition.

The first condition detector 119 includes a counter A for detecting the first condition, changes the counter A according to a rule of an exemplary embodiment of the present invention, and detects the first condition by using the counter A. The rule for changing the counter A will now be described. The first condition detector 119 increments the counter A of the MS by 1 if a difference between a maximum Tx power of the MS and the actual Tx power used by the MS is less than a preset threshold, and initializes the counter A of the MS to '0' if the difference is greater than or equal to the preset threshold. In addition, if the counter A is greater than a threshold $A_{TH}$ of the counter A, the first condition detector 119 detects the occurrence of the first condition, and then sets the counter A of the MS to '−D'. Herein, D is the number of frames between a time point at which channel state information of the MS is obtained and a time point at which a transmission format is determined by using the channel state information.

The second condition detector 121 includes a counter B for detecting the second condition, changes the counter B according to a rule of an exemplary embodiment of the present invention, and detects the second condition. The rule for changing the counter B will now be described. The second condition detector 121 increments the counter B of the MS if an error exists in a received burst, and initializes the counter B of the MS to '0' if there is no error. In addition, if the counter B is greater than a threshold $B_{TH}$ of the counter B, the second condition detector 121 detects the occurrence of the second condition, and then initializes the counter B of the MS to '0'.

The transmission format determining unit 123 determines a UL transmission format (i.e., the number of slots and an MCS level) of the MS. In particular, according to an exemplary embodiment of the present invention, when the first condition is detected by the first condition detector 119, the transmission format determining unit 123 controls the MS such that the number of slots currently used by the MS is less than the number of slots previously used. In other words, the transmission format determining unit 123 provides control such that the number of slots allocated to the MS decreases. For example, the transmission format determining unit 123 increases the MS's Tx power value, which is determined by the control information analyzer 113, by a difference between the set point and an average SINR. However, the increased Tx power value is used only to determine the UL transmission format, and is not used to modify the Tx power of the MS. According to another exemplary embodiment in which a smaller number of slots are used, the transmission format determining unit 123 maintains a transmission margin value of the MS to be large. The transmission margin value represents a headroom which is calculated by using the UL Tx power fed back from the MS. That is, the transmission margin value represents a capacity which is reserved so that a portion of a candidate slot space cannot be allocated according to a channel variation.

In addition, when the second condition is detected by the second condition detector 121, an MCS level that is lower than a currently used MCS level is applied to the MS under the control of the transmission format determining unit 123. That is, the second condition detector 121 provides control such that the MCS level of the MS decreases. For example, the second condition detector 121 prevents the use of the MCS level which is currently applied to the MS.

Figure 2:
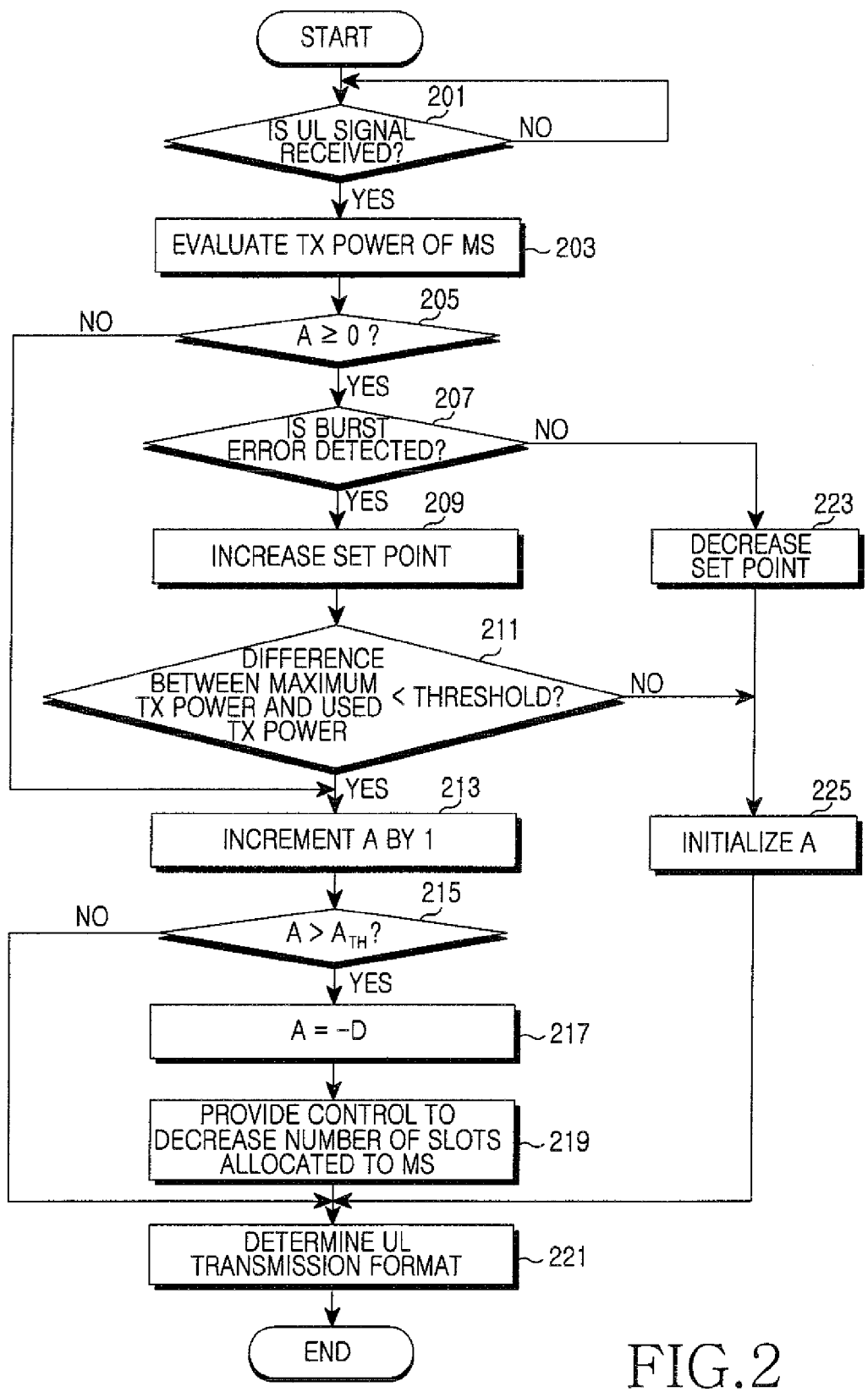
FIG. 2 is a flowchart illustrating a process of detecting a first condition by a BS in a broadband wireless communication system according to an exemplary embodiment of the present invention.

FIG. 2 is a flowchart illustrating a process of detecting the first condition by a BS in a broadband wireless communication system according to an exemplary embodiment of the present invention. In FIG. 2, the first condition is detected for one MS, and corresponding steps of the process are illustrated. If a plurality of MSs communicate with the BS through UL communication, the BS must perform the following process for each MS.

Referring to FIG. 2, the BS determines whether an UL signal is received in step 201.

Upon receiving the UL signal, the BS evaluates information on the Tx power of the signal transmitted from the MS in step 203. The Tx power information is evaluated by using control information received from the MS. Further, the Tx power information is received periodically or is received when the MS decides to transmit the Tx power information. That is, the BS evaluates information on the Tx power of the MS by analyzing the received control information, or evaluates information on previously received Tx power of the MS. The control information including the Tx power information may be referred to as a 'bandwidth request and UL Tx power report header'.

In step 205, the BS determines whether a counter A for detecting the first condition is greater than or equal to '0'. The counter A for determining the first condition will hereinafter simply be referred to as 'A'.

If A is less than '0', the process proceeds to step 213 which is described below.

If A is greater than or equal to '0', the BS determines if an error is detected in a burst received from the MS in step 207. The error may be detected by performing a CRC operation.

If no error is detected in the burst in step 207, the BS decreases a set point of the MS in step 223. Subsequently, the BS initializes A to '0' in step 225. Then, the BS determines a UL transmission format of the MS in step 221.

Otherwise, if the error is detected in the burst in step 207, the BS increases the set point of the MS in step 209. That is, since the detected error occurs when the Tx power of the MS is not sufficient, the BS increases a reference value of an SINR.

In step 211, the BS calculates a difference between the MS's maximum Tx power and the MS's Tx power determined in step 203, and then determines whether the difference is less than a preset threshold. If the difference is greater than or equal to the preset threshold, the BS initializes A to '0' in step 225. Then, in step 221, the BS determines the UL transmission format of the MS according to currently stored channel state information.

On the other hand, if the difference is less than the preset threshold, the BS increments A by '1' in step 213. The greater the A, the higher the probability that the first condition occurs. Therefore, since the BS estimates in step 211 that the Tx power used in the MS is approximately the same as the maximum Tx power, the BS increments A by '1'.

In step 215, the BS determines whether A is greater than a threshold $A_{TH}$ of the counter A. The threshold $A_{TH}$ will hereinafter simply be referred to as $A_{TH}$. Herein, $A_{TH}$ is a reference value for detecting the first condition. If A is less than or equal to $A_{TH}$, the BS determines that the first condition has not occurred, and thus determines the UL transmission format of the MS according to the currently stored channel state information in step 221.

Otherwise, if A is greater than $A_{TH}$, the BS determines that the first condition has occurred, and sets A to '−D' in step 217. Herein, D is the number of frames between a time point at which channel state information of the MS is obtained and a time point at which a transmission format is determined by using the channel state information. By setting A to '−D', the transmission format can be prevented from being incorrectly determined by using the currently stored channel state information (i.e., previously obtained channel state information).

In step 219, the BS provides control such that the number of slots allocated to the MS decreases. For example, the BS increases the MS's Tx power value, which is received from the MS, by a difference between the set point and the average SINR. However, the increased Tx power value is used only when the BS determines the UL transmission format, and is not used to modify the Tx power of the MS. According to another exemplary embodiment in which a smaller number of slots are used, the BS maintains a transmission margin value of the MS to be large. The transmission margin value represents a headroom which is calculated by using the UL Tx power fed back by the MS. That is, the transmission margin value represents a capacity which is reserved so that a portion of a candidate slot space cannot be allocated according to a channel variation.

In step 221, the BS determines the UL transmission format of the MS. In this case, since the Tx power value of the MS has been increased in step 219, the number of slots allocated to the MS is less than the number of previously allocated slots. Therefore, the first condition in which a large number of slots are continuously allocated can be addressed.

Figure 3:
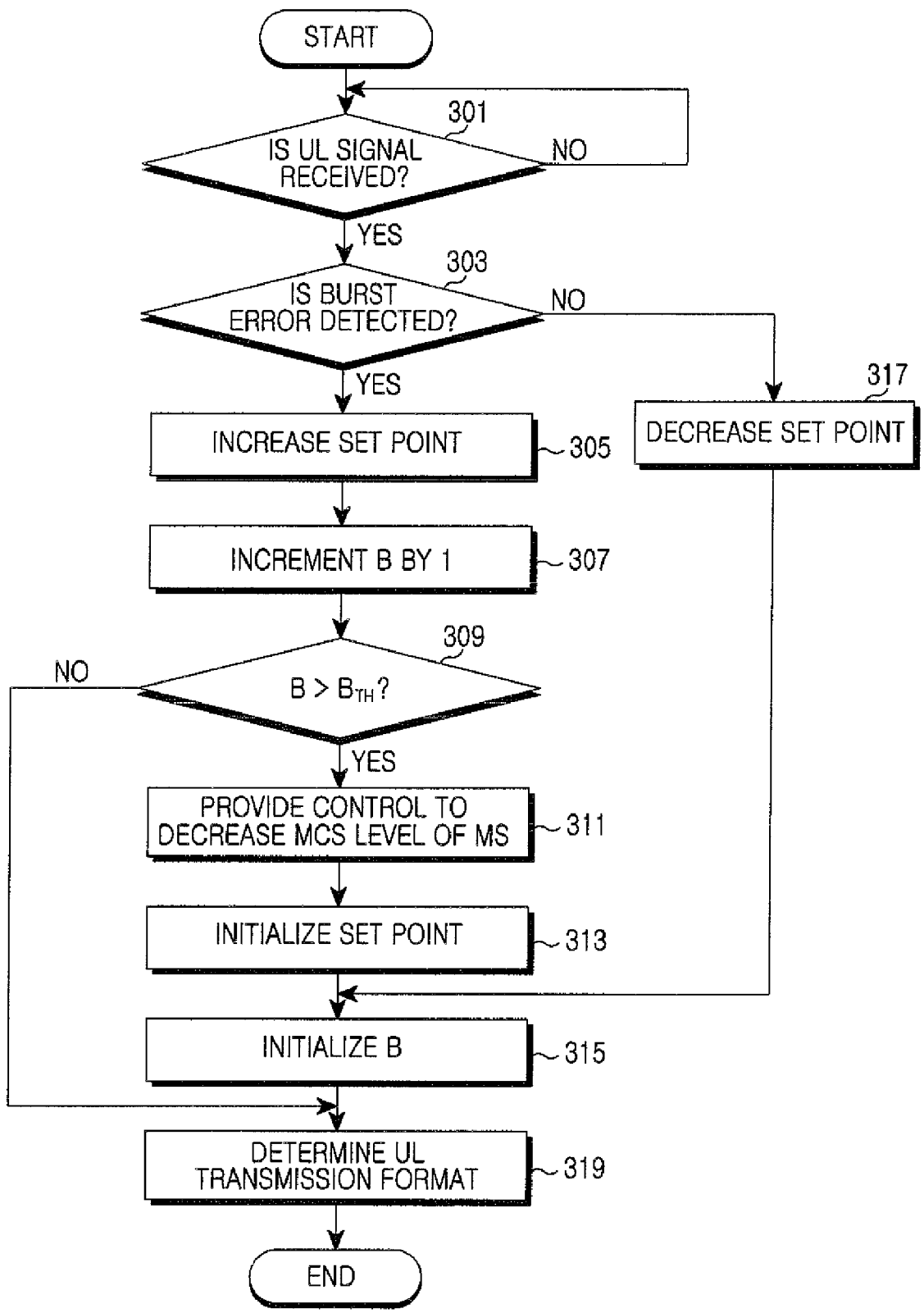
FIG. 3 is a flowchart illustrating a process of detecting a second condition by a BS in a broadband wireless communication system according to an exemplary embodiment of the present invention.

FIG. 3 is a flowchart illustrating a process of detecting the second condition by a BS in a broadband wireless communication system according to an exemplary embodiment of the present invention. In FIG. 3, the second condition is detected for one MS, and corresponding steps of the process are illustrated. If a plurality of MSs communicate with the BS through UL communication, the BS must perform the following process for each MS.

Referring to FIG. 3, the BS determines whether an UL signal is received in step 301.

Upon receiving the UL signal, the BS determines if an error is detected in a burst received from the MS in step 303. If no error is detected in the burst the BS decreases a set point of the MS in step 317. Then, in step 315, the BS initializes a counter B for detecting the second condition to '0'. The counter B for detecting the second condition will hereinafter simply be referred to as 'B'. Then, the BS determines a UL transmission format of the MS in step 319.

Otherwise, if the error is detected in the burst in step 303, the BS increases the set point of the MS in step 305. That is, since the detected error occurs when the Tx power of the MS is not sufficient, the BS increases a reference value of an SINR.

In step 307, the BS increments B by 1. The greater the B, the higher the probability that the second condition occurs. Therefore, since the BS estimates that an Rx SINR is not sufficient in step 305, the BS increments B by 1.

In step 309, the BS determines whether B is greater than a threshold $B_{TH}$ of the counter B. The threshold $B_{TH}$ will hereinafter simply be referred to as $B_{TH}$. If B is less than or equal to $B_{TH}$, the BS determines a UL transmission format of the MS according to currently stored channel state information in step 319.

Otherwise, if B is greater than $B_{TH}$ in step 309, the BS detects the occurrence of the second condition, and thus in step 311, provides control such that an MCS level of the MS decreases. For example, the BS prevents the use of the MCS level which is currently applied to the MS. Accordingly, the MS uses an MCS level lower than an MCS level currently applied to the MS.

In step 313, the BS initializes the set point of the MS. An initial value of the set point is determined according to a system configuration.

In step 315, the BS initializes B to '0'. That is, since the second condition occurs and thus a permissible MCS level is restricted, the BS initializes B.

In step 319, the BS determines the UL transmission format of the MS. In this case, the BS determines the UL transmission format according to the limitation of the MCS level determined in step 311.

The exemplary embodiments which have been described with reference to FIG. 2 and FIG. 3 are respectively provided to detect and address the first condition and the second condition. However, the BS of the present invention may detect both the first and second conditions, and in this case, the BS may simultaneously perform the process of FIG. 2 and the process of FIG. 3. Preferably, $B_{TH}$ is greater to some extent than $A_{TH}$. This is because, when $A_{TH}$ and $B_{TH}$ are set to a similar value, the first condition may be mistakenly determined as the second condition, or vise versa. When $B_{TH}$ is set to be greater to some extent than $A_{TH}$, the occurrence of the first condition is not determined as the occurrence of the second condition. In addition, although the first condition may be mistakenly detected when the second condition occurs, since a burst error is continuously occurring in this case, a requirement for detecting the second condition is eventually satisfied.

According to exemplary embodiments of the present invention, a UL transmission format is determined by detecting exceptional conditions that cannot be addressed by a conventional power control mechanism in a broadband wireless communication system. Therefore, a burst error which occurs due to an incorrect UL transmission format can be reduced, and a waste of an unnecessary bandwidth can be avoided.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A Base Station (BS) apparatus in a wireless communication system, the apparatus comprising:
a manager for increasing a set point associated with a Mobile Station (MS) if an error is detected in a burst received from the MS;
a detector for incrementing a counter associated with the MS if a difference, between a maximum Transmission (Tx) power of the MS and a Tx power used by the MS when transmitting the burst in which the error was detected, is less than a difference threshold; and
a determining unit for decreasing a number of slots allocated to the MS, if the counter associated with the MS is greater than a counter threshold,
wherein the detector sets the counter associated with the MS to a preset negative integer value if the counter associated with the MS is greater than the counter threshold, wherein the preset negative integer value is equal to a number of frames between a time point at which channel state information is obtained and a time point at which the transmission format is determined by using the channel state information.

2. The apparatus of claim 1, wherein the manager decreases the set point associated with the MS if no error is detected in the burst received from the MS.

3. The apparatus of claim 1, wherein the detector initializes the counter associated with the MS if the difference is greater than or equal to the difference threshold.

4. The apparatus of claim 1, wherein, if the counter is less than zero when the burst is received from the MS, the detector increments the counter regardless of whether the error is detected in the burst.

5. The apparatus of claim 1, wherein the determining unit increases a Tx power value received from the MS to decrease the number of slots allocated to the MS.

6. The apparatus of claim 1, wherein the determining unit increases a transmission margin associated with the MS to decrease the number of slots allocated to the MS.

7. A Base Station (BS) apparatus in a wireless communication system, the apparatus comprising:
a manager for increasing a set point associated with a Mobile Station (MS) if an error is detected in a burst received from the MS;
a detector for incrementing a counter associated with the MS if the error is detected in the received burst; and
a determining unit for decreasing a Modulation and Coding Scheme (MCS) level associated with the MS, if the counter associated with the MS is greater than a counter threshold,
wherein the manager initializes the set point associated with the MS if the counter associated with the MS is greater than the counter threshold, and
wherein the detector initializes the counter associated with the MS if the counter associated with the MS is greater than the counter threshold.

8. The apparatus of claim 7, wherein the manager decreases the set point associated with the MS if no error is detected in the burst received from the MS.

9. The apparatus of claim 7, wherein the detector initializes the counter if no error is detected in the burst received from the MS.

10. The apparatus of claim 7, wherein the determining unit prevents the use of the MCS level currently applied to the MS to decrease the MCS level associated with the MS.

11. A Base Station (BS) apparatus in a wireless communication system, the apparatus comprising:
a manager for increasing a set point associated with a Mobile Station (MS) if an error is detected in a burst received from the MS;
a first detector for incrementing a first counter associated with the MS if a difference, between a maximum Transmission (Tx) power of the MS and a Tx power used by the MS when transmitting the burst in which the error was detected, is less than a difference threshold;
a second detector for incrementing a second counter associated with the MS if the error is detected in the received burst; and
a determining unit for decreasing a number of slots allocated to the MS, if the first counter associated with the MS is greater than a first counter threshold, and for decreasing a Modulation and Coding Scheme (MCS) level associated with the MS, if the second counter is greater than a second counter threshold,
wherein the second counter represents a number of consecutively detected error, and
wherein the first detector sets the first counter associated with the MS to a preset negative integer value if the counter associated with the MS is greater than the first counter threshold, wherein the preset negative integer value is equal to a number of frames between a time point at which channel state information is obtained and a time point at which the transmission format is determined by using the channel state information.

12. The apparatus of claim 11, wherein the second counter threshold is greater than the first counter threshold.

13. A method of determining an UpLink (UL) transmission format by a Base Station (BS) in a wireless communication system, the method comprising:

increasing a set point associated with a Mobile Station (MS) if an error is detected in a burst received from the MS;

incrementing a counter associated with the MS if a difference, between maximum Transmission (Tx) power of the MS and Tx power used by the MS when transmitting the burst in which the error was detected, is less than a difference threshold;

decreasing a number of slots allocated to the MS, if the counter associated with the MS is greater than a counter threshold; and setting the counter associated with the MS to a preset negative integer value if the counter associated with the MS is greater than the counter threshold, wherein the preset negative integer value is equal to a number of frames between a time point at which channel state information is obtained and a time point at which the transmission format is determined by using the channel state information.

14. The method of claim 13, further comprising decreasing the set point associated with the MS if no error is detected in the burst received from the MS.

15. The method of claim 13, further comprising initializing the counter associated with the MS if the difference is greater than or equal to the difference threshold.

16. The method of claim 13, further comprising, if the counter is less than zero when the burst is received from the MS, incrementing the counter regardless of whether the error is detected in the burst.

17. The method of claim 13, wherein the decreasing of the number of slots allocated to the MS comprises increasing a Tx power value received from the MS.

18. The method of claim 13, wherein the decreasing of the number of slots allocated to the MS comprises increasing a transmission margin associated with the MS.

19. A method of determining an UpLink (UL) transmission format by a Base Station (BS) in a wireless communication system, the method comprising:

increasing a set point associated with a Mobile Station (MS) if an error is detected in a burst received from the MS;

incrementing a counter associated with the MS if the error is detected in the received burst;

decreasing a Modulation and Coding Scheme (MCS) level associated with the MS, if the counter associated with the MS is greater than a counter threshold;

initializing the set point associated with the MS if the counter associated with the MS is greater than the counter threshold; and initializing the counter associated with the MS if the counter associated with the MS is greater than the counter threshold.

20. The method of claim 19, further comprising decreasing the set point associated with the MS if no error is detected in the burst received from the MS.

21. The method of claim 19, further comprising initializing the counter if no error is detected in the burst received from the MS.

22. The method of claim 19, wherein the decreasing of the MCS level associated with the MS comprises preventing the use of the MCS level currently applied to the MS.

23. A method of determining an UpLink (UL) transmission format by a Base Station (BS) in a wireless communication system, the method comprising:

incrementing a first counter associated with a Mobile Station (MS) if an error is detected in a burst received from the MS and if a difference, between a maximum Transmission (Tx) power of the MS and a Tx power used by the MS when transmitting the burst in which the error was detected, is less than a difference threshold;

incrementing a second counter associated with the MS if the error is detected in the received burst;

decreasing a number of slots allocated to the MS, if the first counter associated with the MS is greater than a first counter threshold;

decreasing a Modulation and Coding Scheme (MCS) level associated with the MS, if the second counter is greater than a second counter threshold; and setting the first counter associated with the MS to a preset negative integer value if the first counter associated with the MS is greater than the first counter threshold, wherein the second counter represents a number of consecutively detected error, and wherein the preset negative integer value is equal to a number of frames between a time point at which channel state information is obtained and a time point at which the transmission format is determined by using the channel state information.

24. The method of claim 23, wherein the second counter threshold is greater than the first counter threshold.

* * * * *